Figure 1:
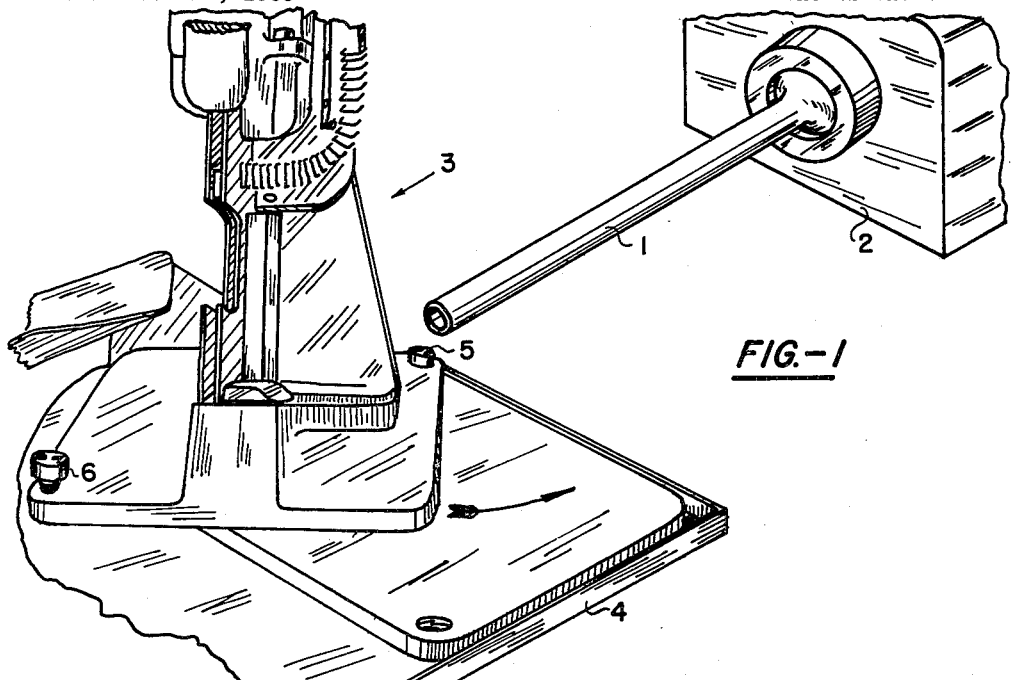

July 6, 1965    G. O. SHORT    3,192,559
SAUSAGE CASING SIZING APPARATUS
Filed Dec. 20, 1963    3 Sheets-Sheet 1

GEORGE O. SHORT
INVENTOR

BY Neal J. Mosely
his Attorney

GEORGE O. SHORT
INVENTOR.

July 6, 1965   G. O. SHORT   3,192,559
SAUSAGE CASING SIZING APPARATUS
Filed Dec. 20, 1963   3 Sheets-Sheet 3
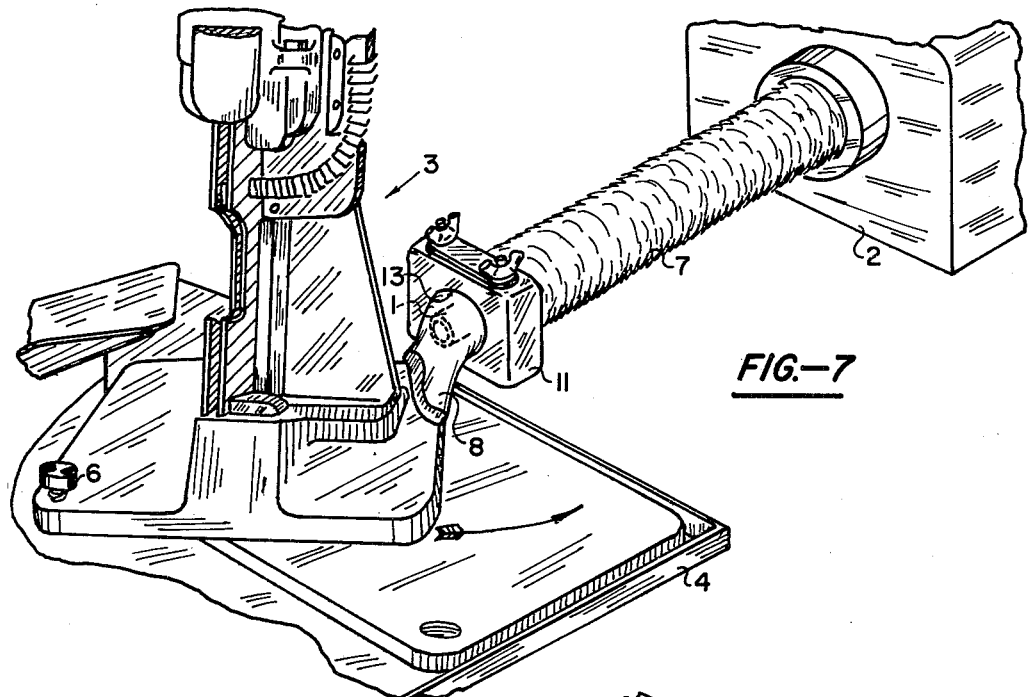
FIG.—7
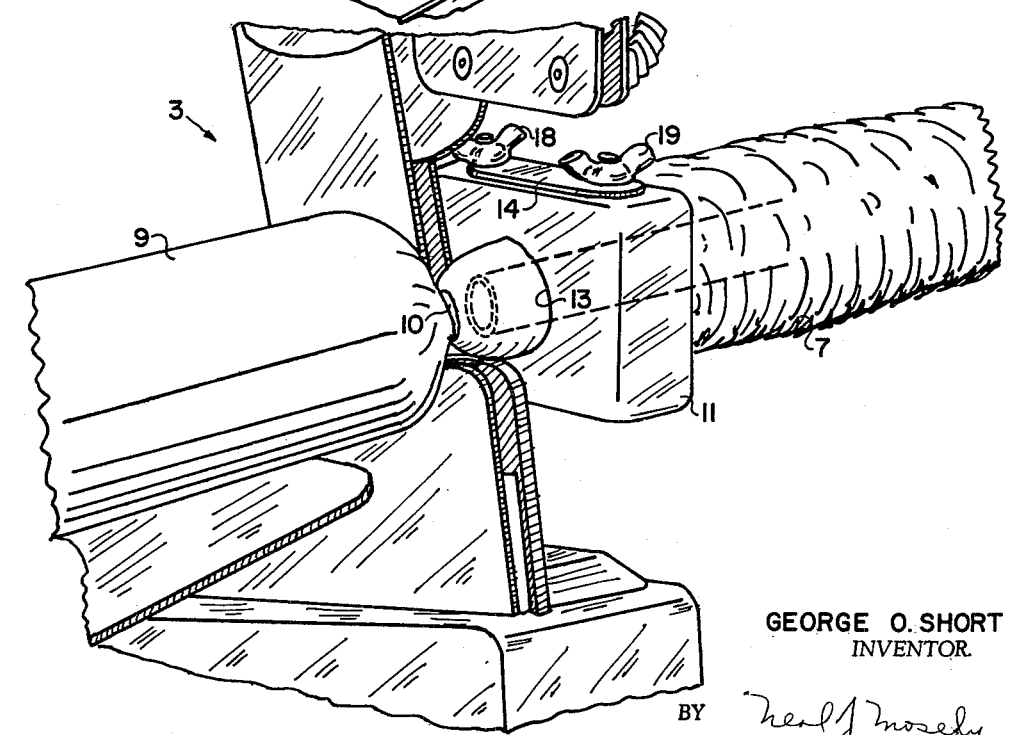
FIG.—8
GEORGE O. SHORT
INVENTOR.
BY Neal J. Mosely
His Attorney

United States Patent Office 3,192,559
Patented July 6, 1965

3,192,559
SAUSAGE CASING SIZING APPARATUS
George O. Short, North Hollywood, Calif., assignor to Grand Taste Packing Company, Los Angeles, Calif., a corporation of California
Filed Dec. 20, 1963, Ser. No. 332,103
6 Claims. (Cl. 17—35)

This invention relates to new and useful improvements in apparatus for stuffing sausage meat into shirred sausage casings and more particularly to an improved apparatus for controlling the rate of flow of shirred sausage casing off the stuffing horn and the size of the sausage product.

In the preparation of sausages, comminuted meat, together with spices, fillers, seasonings, etc., is prepared in the form of a paste or emulsion and ejected through a nozzle or stuffing horn into a sausage casing. The casing is tied or clipped and thus formed into suitable links at predetermined intervals and is subsequently processed. The casing filled with the sausage meat may be subjected to cooking, smoking, etc. or in some cases may be supplied to the customer without additional processing. Small sausages, of the frankfurter type, are generally smoked and cooked and the casings removed prior to marketing.

In the processing of various sausages, different types of sausage casings are employed. For the preparation of small sausages, such as frankfurters, small-diameter, thin-walled, casings are prepared from regenerated cellulose or other suitable materials and are generally shirred and compressed from lengths ranging from 40 to 160 feet or more down to the shirred and compressed length of the order of a few inches.

An early type of shirring machine and the resulting shirred product are shown in Dietrich U.S. Patent 2,010,626. Improved forms of shirring machines and the shirred products produced thereon are shown in Korsgaard U.S. Patent 2,583,654 and Blizzard et al. U.S. Patents 2,722,714, 2,722,715 and 2,723,201. While the shirring apparatus process described in the aforementioned patents is primarily used in the shirring of thin-walled, small-diameter casings for small sausages, there has been an increasing demand recently for larger casings which are shirred in this manner.

As mentioned above, the preparation of small sausages such as frankfurters, is carried out using thin-wall, small-diameter shirred sausage casings. Larger sausages are prepared using larger-diameter heavy-walled casings, referred to in the trade as "miscellaneous" casings. Still larger sausages of the bologna type are generally prepared using fibrous-paper reinforced casings, known in the trade as "fibrous" casings. Fibrous casings are prepared by forming a high-wet-strength hemp paper (or other suitable paper) into a long continuous tube and impregnating the tube with viscose and regenerating the cellulose therein. Both miscellaneous and fibrous casings have been shirred using the process and apparatus of the Blizzard et al. patents and the shirred products have proved to be especially useful in the continuous preparation of large-diameter sausages, such as bolognas.

In the preparation of large diameter sausages, a fibrous or miscellaneous casing is placed on a stuffing horn and the end of the casing closed off in preparation for filling. The sausage emulsion is ejected through the horn which causes the shirred casing to feed off and be filled. The stuffing apparatus is usually used in conjunction with a suitable linking apparatus which may be a suitable tying apparatus or clipping apparatus for forming the filled casing into links of predetermined length. In stuffing casing to form sausages of this type, the stuffing machine operator has had to hold the shirred casing on the stuffing horn with one hand to restrict its flow off the horn while operating the clipping or tying machinery with his other hand. This has presented some safety hazards and has been quite inefficient. There has been a considerable need in the sausage-making industry for a suitable mechanism or process for controlling the flow of shirred casing off a stuffing horn while permitting the stuffing machine operator to use both hands in controlling other portions of the equipment.

It is, therefore, one object of this invention to provide a new and improved device for use in combination with a stuffing machine to control the flow of casing off a stuffing horn.

Another object of this invention is to provide an improved device for use in combination with a stuffing machine to restrict the flow of shirred casing off a stuffing horn and control the stuffed sausages produced upon the filling of the casing.

Still another object of this invention is the provision of an improved device used in combination with a stuffing machine and a linking apparatus for controlling the flow of shirred casing off a stuffing horn.

Still another object of this invention is to provide an improved flow-restricting device for controlling the flow of casing from the stuffing horn during the stuffing operation.

A feature of this invention is the provision of improved device comprising a solid resilient member having an aperture slightly larger than a stuffing horn and smaller than the exterior diameter of shirred casing placed on the stuffing horn and arranged for flow of casing through an aperture therein which restricts the rate of flow of casing off the horn during filling and controls the size of the sausage product.

Another feature of this invention is the provision of an improved flow-controlling device for use in restricting the flow of the shirred casing off a stuffing horn which comprises an annular resilient member of a soft material such as rubber which includes an adjustable means for deforming the member to vary the size and shape of the aperture therein.

Other objects and features of this invention will become apparent from time to time and throughout the specification and claims as hereinafter related.

Figure 2:
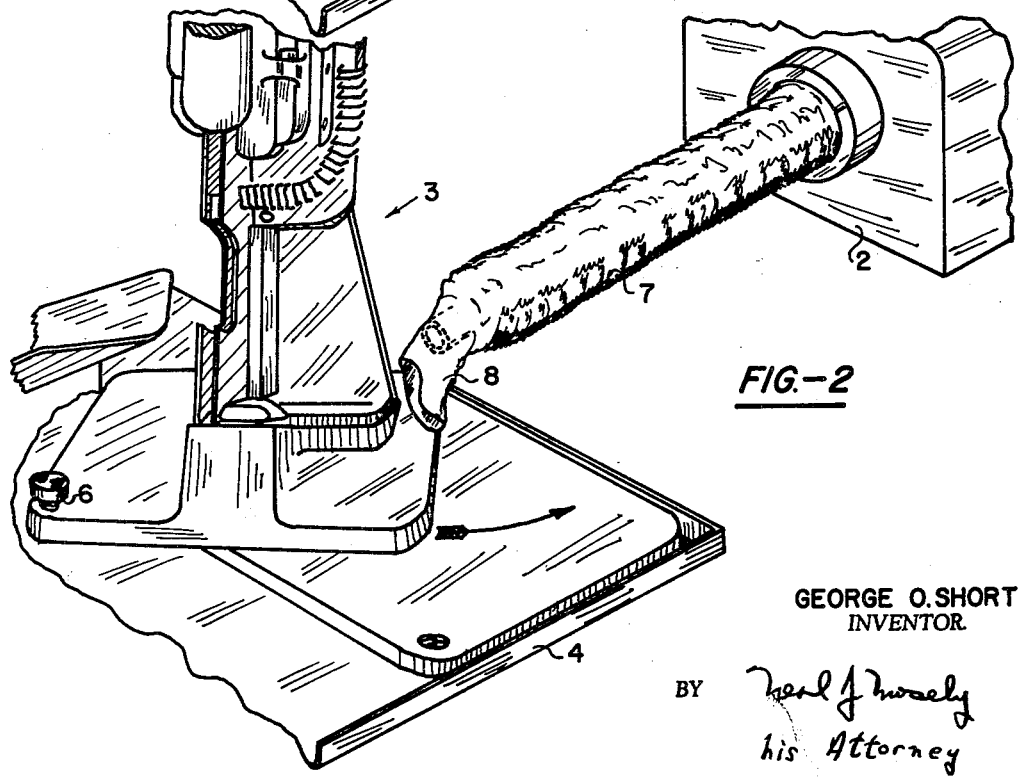
Figure 3:
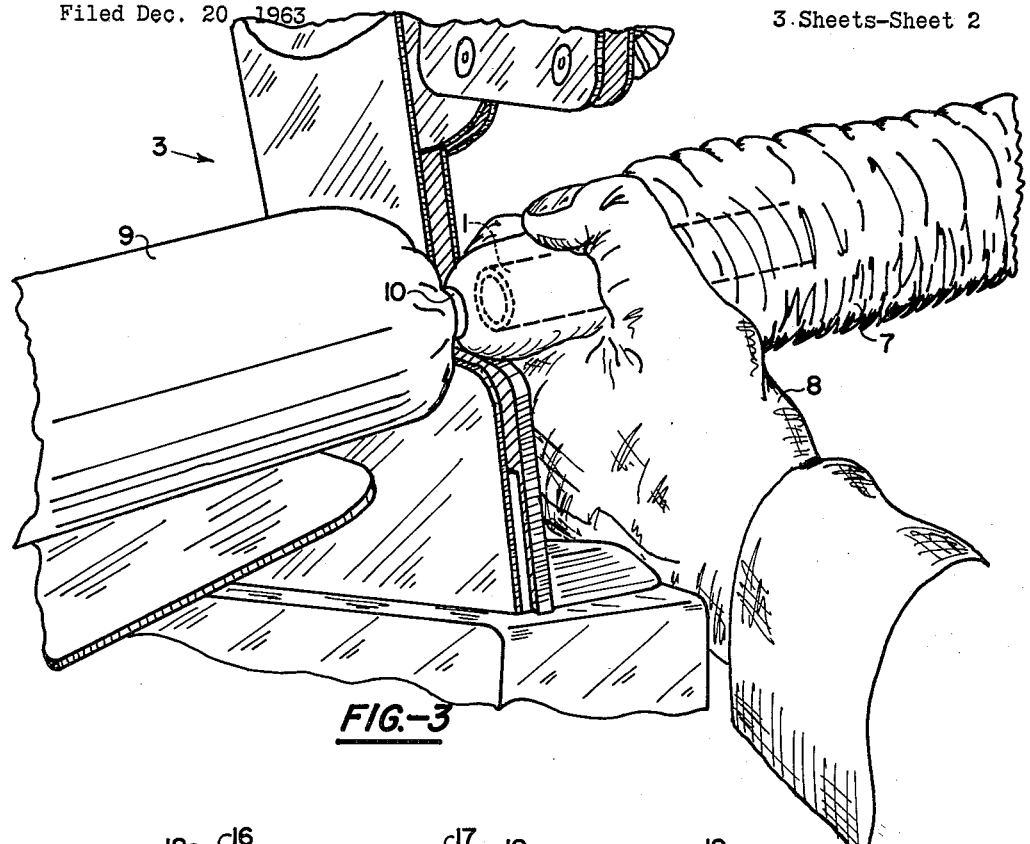
Figures 4, 5:
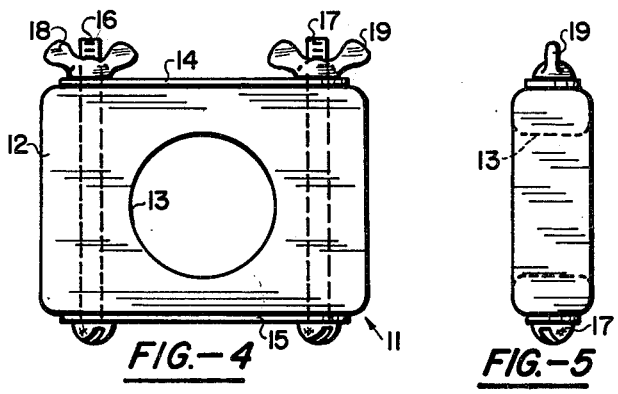
Figure 6:
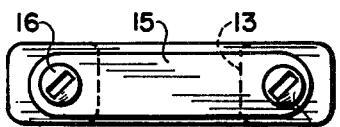

In the accompanying drawings to be taken as part of this specification, there is clearly and fully illustrated a preferred embodiment of this invention, in which drawings, FIG. 1 is an isometric view showing a sausage stuffing horn and a linking apparatus such as a tier or clipper, just prior to placing the shirred casing into position, FIG. 2 is an isometric view of the stuffing horn and linking apparatus as shown in FIG. 1 but including the shirred casing in position for stuffing, FIG. 3 of the drawing is an enlarged isometric view of a portion of the apparatus shown in FIGS. 1 and 2 showing the hand of the stuffing machine operator holding the casing against too rapid flow away from the stuffing horn, and showing the formation of the filled casing into links by the linking apparatus, FIGS. 4, 5 and 6 are front, side and top elevation views of a resilient flow restricting member used in controlling the flow of shirred casing off a stuffing horn in accordance with this invention.

FIG. 7 of the drawing is a view similar to FIG. 2 showing the flow-restricting device positioned over the end of the casing on the stuffing horn, and FIG. 8 is a view similar to FIG. 3 showing the resilient flow restricting member in position performing its function of controlling the rate of casing flow off of the stuffing horn.

Referring to the drawings by numerals of reference, FIGS. 1 to 3 show prior art apparatus for the stuffing of various types of sausage casings. In these figures, there is shown a stuffing horn 1, which extends from an enclosure 2, which is connected to or may be part of a suitable pumping apparatus for supplying sausage paste or emulsion to fill a sausage casing. The stuffing horn 1 is shown extending toward a suitable linking apparatus 3.

Linking apparatus 3 is supported on a suitable base 4 and is secured thereon by bolts 5 and 6. In FIG. 1, bolt 6 is shown in a retracted position so that linking apparatus 3 can be rotated away from stuffing horn 1 to allow the stuffing machine operator to place the shirred casing on the stuffing horn. Linking apparatus 3 is not a part of this invention in any specific detail. Linking apparatus 3 can be any suitable commercially available apparatus for clipping, tying, or otherwise forming and securing casing filled with sausage emulsion into links of suitable size.

A shirred strand of casing 7 is placed on stuffing horn 1, as shown in FIG. 2, and the end portion 8 of the casing is tied, twisted, or otherwise closed so that ejection of sausage emulsion through the stuffing horn will cause the casing to be filled and to flow off the horn. The linking mechanism 3 is rotated to the right as shown by the directional arrow in FIGS. 1 and 2 and is operable to tie, clip, or otherwise secure the extended casing into successive links.

When the sausage emulsion is ejected through stuffing horn 1, the casing 7 is filled with meat and extended into a long filled sausage, as indicated in FIGS. 3 and 8. The extent to which the casing is filled with meat is at least partially a function of the rate at which the casing is fed off the stuffing horn. If the rate of flow of casing off the horn is retarded, the casing can be filled to a greater degree and larger sausages are formed.

In the past, it has been necessary for the stuffing machine operator to hold the shirred casing 7 as shown by hand 8 in FIG. 3 to restrict the flow of casing off the stuffing horn so that the casing will be thoroughly filled and to prevent backflow of meat around the horn. The casing is filled to form a large encased sausage as illustrated by reference numeral 9 in FIG. 3 and is clipped as at 10 to form a suitable link by linking apparatus 3. As previously noted, the formation of the sausage into links could be equally well carried out by a tying apparatus or any other suitable apparatus for formation of sausage links. As noted above, the necessity for the stuffing machine operator to secure the casing manually against rapid flow off the stuffing horn has seriously impaired the efficiency of sausage stuffing operation and has created the demand for a suitable apparatus to control the rate of casing feed.

In FIGS. 4, 5, and 6 of the drawing there is shown a novel flow-restricting device 11 which is used in accordance with this invention for controlling the rate of flow of shirred casing off the stuffing horn. Flow-restricting device 11 consists of a soft resilient member 12, preferably of a soft resilient material such as a soft rubber, or equivalent material such as synthetic rubber or soft plastic elastomers. Member 12 is shown as being rectangular in cross-section although any annular member could be used provided it is formed of suitable material and of proper size. Member 12 has an aperture 13 which is of a size slightly larger than stuffing horn 1 but smaller in diameter than the external diameter of the shirred casing 7. Resilient member 12 is provided with rigid end plates 14 and 15, preferably of sheet metal. Bolts 16 and 17 extend through passages in resilient member 12 and interconnect the plates 14 and 15. The bolts 16 and 17 are provided with wing nuts 18 and 19 which can be tightened or loosened to deform resilient member 12 and vary the size and shape of aperture 13.

In FIG. 7, the shirred casing 7 is installed in place on the stuffing horn 1 as shown in FIG. 2 and the resilient member 11 is positioned with the casing extended through aperture 13. The other parts shown in FIG. 7 are identical and have the same reference numerals as in FIGS. 1 and 2.

After resilient member 11 is positioned as shown in FIG. 7, the linking apparatus 3 is rotated as shown by the directional arrow in FIG. 7. The linking apparatus is secured on supporting plate 4 and the stuffing apparatus is ready for operation. The end portion 8 of the shirred strand of casing 7 is closed and the meat emulsion is ejected through stuffing horn 1 to fill the casing. The meat emulsion fills the sausage casing and causes it to feed off the stuffing horn 1 and to be filled fully to provide firmly packed sausages. The casing is pulled off of the stuffing horn by the sausage which is ejected through the horn and forms fully packed filled sausages as illustrated by reference number 9. As in FIG. 3 of the drawing, the linking mechanism, which is shown as a clip applying device, forms the casing into the successive links of predetermined length. Resilient member 11 floats freely on the casing at the end of stuffing horn 1 and is restricted against movement by engagement with linking apparatus 3. The casing which is fed off the stuffing horn passes through aperture 13 and is restricted against movement by frictional engagement against the side walls of the aperture. It should be noted that aperture 13 is provided with rounded edges as indicated in FIGS. 5 and 6 to prevent undue abrasion of the casing passing therethrough. The resilient member 11 prevents backflow of meat emulsion around the horn and retards movement of the casing off the stuffing horn. This permits the casing to be stuffed more fully and thus controls the size of the sausage product.

Wing nuts 18 and 19 on bolts 16 and 17 are adjustable to compress resilient member 11 to vary the size of the aperture 13. This variation in size of aperture 13 permits a slight adjustment for use of the resilient member with different sizes of shirred casing. Also, the adjustment in size and shape of aperture 13 permits some control with respect to the size of the stuffed product by varying the frictional force applied to the casing as it is fed through aperture 13.

While this process and apparatus have been described with special emphasis upon its use with shirred fibrous casing, it should be understood that it is equally applicable to controlling the flow of any shirred casing or shirred tubular material off a stuffing horn. Thus, this flow-control device and process can be used with shirred frankfurter casings, shirred miscellaneous casings, shirred fibrous casings, shirred tubular fabric type casings, and various shirred tubular plastic materials. In the case of thin-walled tubular plastics, the tubular material may be hand shirred on the stuffing horn rather than applied as the mechanically shirred product. Likewise, sausage casings could be hand shirred on the stuffing horn, although this is rarely done in view of the ready commercial availability of machine shirred casings.

While this invention has been described fully and completely with special emphasis upon one preferred embodiment, it should be understood that within the scope of the appended claims, the invention may be practiced otherwise than as specifically described herein.

What is claimed is:

1. The combination with a sausage stuffing machine, including a stuffing horn, through which sausage emulsion is ejected and on which a shirred casing is positioned for filling, and sausage linking means positioned adjacent to the open end of the stuffing horn to form the filled sausage casing into links, of a casing flow-restricting device comprising a solid resilient member having an aperture of a size larger than said stuffing horn and smaller than the exterior diameter of the shirring casing, said resilient member being in a free floating position at the end of the stuffing horn and restricted against movement by engagement with said sausage linking means with said casing being extended from a shirred position through the aperture in said resilient member and restricted in the rate of movement by frictional engagement therewith.

2. The combination as defined in claim 1 in which the sausage linking means is a clipping machine.

3. The combination as defined in claim 1 in which the resilient member is an annular member of soft rubber.

4. The combination as defined in claim 1 which includes means to deform said resilient member to adjust the size of the aperture therein.

5. The combination as defined in claim 1 in which said resilient member is an annular member of soft rubber provided with threaded adjustment members for adjusting the size of said aperture by compression.

6. A solid resilient member of soft rubber having a central aperture of a size substantially equal to the diameter of a sausage casing for use in controlling the flow of casing off a stuffing horn, said member being provided with threaded adjustment members extending through the walls thereof and operable to deform said member to vary the size of the aperture therein.

References Cited by the Examiner
UNITED STATES PATENTS

| | | | |
|---|---|---|---|
| 1,366,183 | 1/21 | Hottmann | 17—33 |
| 2,066,335 | 1/37 | Comstock | 24—256 X |
| 2,695,770 | 11/54 | Stone. | |
| 2,899,733 | 8/59 | Sundberg | 24—243 X |

OTHER REFERENCES

German Printed Application 1,143,413, Feb. 7, 1963.

SAMUEL KOREN, *Primary Examiner.*

LUCIE H. LAUDENSLAGER, *Examiner.*